US011239668B2

(12) United States Patent
Nobre et al.

(10) Patent No.: US 11,239,668 B2
(45) Date of Patent: Feb. 1, 2022

(54) CHARGER CASE FOR WEARABLE ELECTRONICS

(71) Applicant: GOOGLE LLC, Mountain View, CA (US)

(72) Inventors: Victor Nobre, Kitchener (CA); Stephen E. Orzel, Hamilton (CA); Jaehong Choi, Waterloo (CA)

( * ) Notice: Subject to any disclaimer, the term of this patent is extended or adjusted under 35 U.S.C. 154(b) by 305 days.

(21) Appl. No.: 16/576,965

(22) Filed: Sep. 20, 2019

(65) Prior Publication Data

US 2020/0099231 A1 Mar. 26, 2020

Related U.S. Application Data

(60) Provisional application No. 62/734,792, filed on Sep. 21, 2018.

(51) Int. Cl.
| | |
|---|---|
| *H02J 7/00* | (2006.01) |
| *G02B 27/01* | (2006.01) |
| *G06F 1/16* | (2006.01) |
| *H01M 50/20* | (2021.01) |
| *A45C 11/04* | (2006.01) |

(52) U.S. Cl.
CPC .......... *H02J 7/0013* (2013.01); *G02B 27/017* (2013.01); *G06F 1/163* (2013.01); *G06F 1/1632* (2013.01); *H01M 50/20* (2021.01); *H02J 7/0044* (2013.01); *A45C 11/04* (2013.01); *G02B 2027/0178* (2013.01); *H01M 2220/30* (2013.01); *H02J 7/00* (2013.01)

(58) Field of Classification Search
CPC ...... H02J 7/0013; H02J 7/0042; H02J 7/0063; H02J 7/0044; H02J 7/00; H01M 50/20; H01M 2220/30; G02B 27/01; G02B 27/017; G02B 2027/0178; G06F 1/1632; G06F 1/163; A45C 11/04; Y02E 60/10
USPC .......................................... 320/114
See application file for complete search history.

(56) References Cited

U.S. PATENT DOCUMENTS

| | | | | |
|---|---|---|---|---|
| 8,080,975 | B2 * | 12/2011 | Bessa | H02J 7/0044 320/114 |
| 8,815,430 | B2 * | 8/2014 | Okabe | H01M 50/531 429/121 |
| 9,929,577 | B2 * | 3/2018 | Fathollahi | H02J 7/0044 |
| 10,110,031 | B2 * | 10/2018 | Lee | H02J 7/00038 |
| 10,148,104 | B2 * | 12/2018 | Sa | G06F 1/1632 |
| 10,181,746 | B2 * | 1/2019 | Kramer | H02J 7/025 |
| 11,075,527 | B2 * | 7/2021 | Isaacs | H02J 7/0072 |
| 2009/0284216 | A1 * | 11/2009 | Bessa | H02J 7/0044 320/101 |
| 2010/0176762 | A1 * | 7/2010 | Daymude | H02J 7/0027 320/115 |
| 2013/0323941 | A1 * | 12/2013 | Zeliff | H01R 13/6205 439/39 |
| 2016/0072327 | A1 * | 3/2016 | Knutson | G06F 1/1632 320/108 |

(Continued)

*Primary Examiner* — M Baye Diao

(57) ABSTRACT

A charger case for storing and charging two electronic devices includes a docking tray having two storage compartments to hold the two electronic devices. The charger case includes two device connectors, with each device connector exposed to a respective one of the two storage compartments to establish electrical communication with a respective one of the two electronic devices. A portable charger is included in the case and electrically coupled to the two device connectors.

23 Claims, 10 Drawing Sheets

(56) References Cited

U.S. PATENT DOCUMENTS

| | | | |
|---|---|---|---|
| 2017/0177031 A1* | 6/2017 | Lesizza | H02J 7/0044 |
| 2017/0271900 A1* | 9/2017 | Rose | H01R 25/006 |
| 2018/0242063 A1* | 8/2018 | Chiang | A61B 5/0015 |

* cited by examiner

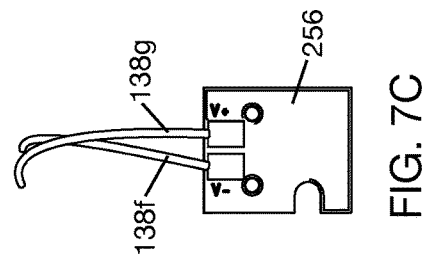
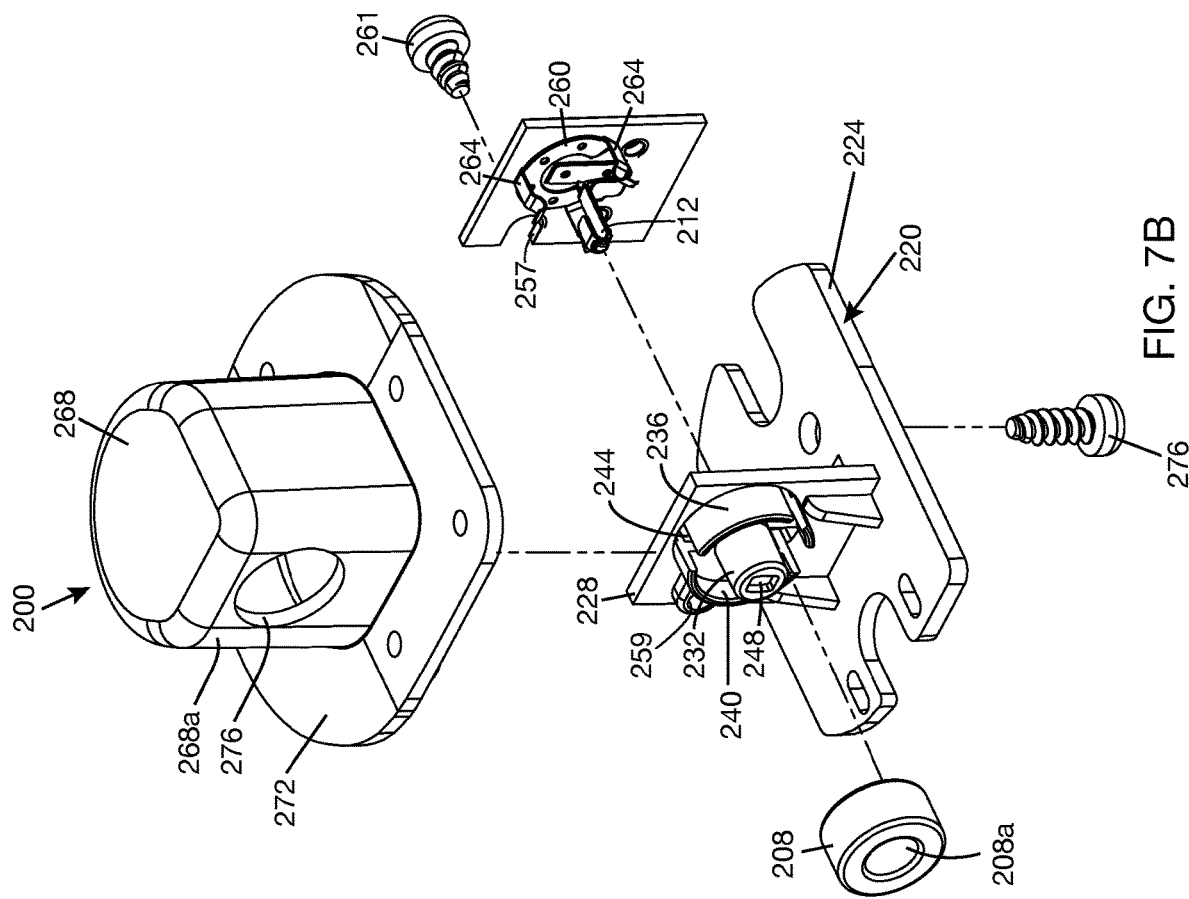

CHARGER CASE FOR WEARABLE ELECTRONICS

CROSS-REFERENCE TO RELATED APPLICATIONS

This application claims the benefit of U.S. Provisional Application No. 62/734,792, filed 21 Sep. 2018, titled "Charger Case for Wearable Electronics", the content of which is incorporated herein in its entirety by reference.

TECHNICAL FIELD

The disclosure relates generally to charger cases and more specifically to a charger case capable of charging two wearable electronic devices simultaneously.

BACKGROUND

There is a new generation of wearable heads-up displays that can be worn on the head like conventional eyeglasses. To interact with content on the wearable heads-up display, a wearable user interface (UI) device that communicates wirelessly with the wearable heads-up display may be used. Both the wearable heads-up display and wearable UI device have storage batteries, or supercapacitors, that need to be periodically recharged. These devices typically have different storage capacities and may have different charging requirements. This generally means that the user will need to carry around two different chargers if portable charging is desired.

SUMMARY

In a first aspect, a charger case for storing and charging a first electronic device and a second electronic device may be summarized as including a top cover; a bottom cover; a docking tray mounted between the top cover and the bottom cover, the docking tray having a top side including a first storage compartment to hold the first electronic device and a second storage compartment to hold the second electronic device; a first device connector exposed to the first storage compartment, the first device connector to establish electrical communication with the first electronic device; a second device connector exposed to the second storage compartment, the second device connector to establish electrical communication with the second electronic device; and a portable charger comprising a rechargeable battery, the portable charger disposed in a space between the docking tray and the bottom cover, the portable charger having a first charging port electrically coupled to the first device connector and a second charging port electrically coupled to the second device connector.

The charger case according to the first aspect may further include one or more of the features described in A1 to A21 below.

A1: A rear edge of the top cover is pivotally coupled to a rear edge of the docking tray.

A2: The first device connector and the second device connector are fastened to the docking tray.

A3: The first device connector include a pair of contact pins exposed at a surface of the docking tray forming a part of the first storage compartment.

A4: The features of A3, where the surface of the docking tray forming a part of the first storage compartment carries a magnet to be detected by the first electronic device when the first electronic device is held in the first storage compartment.

A5: The features of A3, where the first device connector includes a magnet carrier plate and a pair of magnets in spaced apart relation on the magnet carrier plate, and where the pair of magnets are exposed at the surface of the docking tray forming part of the first storage compartment.

A6: The features of A5, where the pair of contact pins are received in a central part of the magnet carrier plate between the pair of magnets.

A7: The features of A6, where the first charging port of the portable charger is electrically coupled to the pair of contact pins.

A8: A plurality of light pipes are embedded in the docking tray, where the light pipes have openings on the top side of the docking tray, and where each of the light pipes is positioned to receive light from at least one light emitting diode in the portable charger.

A9: A bottom side of the docking tray includes a plurality of fins defining a slot in which the rechargeable battery is received.

A10: A strap is provided to retain the rechargeable battery in the slot.

A11: The portable charger includes a USB connector, and the bottom cover includes an access opening aligned with the USB connector.

A12: The portable charger includes a system on chip providing the first charging port and the second charging port, where the system on chip is retained on the bottom side of the docking tray.

A13: The second device connector includes a magnetic connector electrically connected to the system on chip.

A14: The features of A13, where the magnetic connector includes a magnet having a bore, a contact pin received in the bore, and an insulator arranged in the bore to separate the magnet from the contact pin.

A15: The features of A14, where the second device connector further includes a chassis carrying the magnetic connector and a cap having a cavity within which the magnetic connector carried by the chassis is received, where the cap has a side opening, and where the magnetic connector is exposed at the side opening.

A16: The features of A15, where the magnetic connector protrudes from a side surface of the cap through the side opening.

A17: The features of A16, where the cap includes a flange, where the flange is fastened to the docking tray.

A18: The features of A17, where the second storage compartment is defined between a surface of the docking tray and a surface of the cap.

A19: The docking tray may include a pocket at a front edge thereof. At least one magnet may be disposed in the pocket to form a magnetic closure between a front edge of the top cover and the front edge of the docking tray.

A20: The first storage compartment may have a volume to contain a wearable heads-up display in folded form.

A21: The second compartment may have a loop shape.

In a second aspect, a charger case to store and charge a first electronic device and a second electronic device may be summarized as including a housing having an interior; a cover movably coupled to the housing, the cover selectively movable between a closed configuration in which the cover prevents access to the interior of the housing from an exterior thereof and an open configuration in which the cover provides access to the interior of the housing from the exterior thereof; a docking tray in the interior of the housing, the docking tray having a top side including a first storage compartment to hold the first electronic device and a second storage compartment to hold the second electronic device, the top side of the docking tray accessible from the exterior of the housing when the cover is in the open configuration; a first charging interface chargingly coupleable to charge the first electronic device when the first electronic device is in the first storage compartment of the docking tray; a second charging interface chargingly coupleable to charge the second electronic device when the second electronic device is in the second storage compartment of the docking tray; and a first rechargeable power source electrically coupled to at least one of the first charging interface and the second charging interface to provide electrical power thereto.

The charger case according to the second aspect may further include one or more of the features described in B1 to B3 below.

B1: The first charging interface includes a first device connector having a first set of electrical contacts directly electrically accessible by the first electronic device when the first electronic device is in the first storage compartment of the docking tray, where the second charging interface includes a second device connector having a second set of electrical contacts directly electrically accessible by the second electronic device when the second electronic device is in the second storage compartment of the docking tray. Alternatively, the first charging interface includes a first inductor inductively coupleable to a complementary inductor of the first electronic device when the first electronic device is in the first storage compartment of the docking tray, and where the second charging interface includes a second inductor inductively coupleable to a complementary inductor of the second electronic device when the second electronic device is in the second storage compartment of the docking tray.

B2: The first rechargeable power source includes one or more secondary chemical battery cells or one or more supercapacitor cells.

B3: The first storage compartment is dimensioned to hold a wearable heads-up display, and the second storage compartment is sized to hold a ring user input device.

The foregoing general description and the following detailed description are exemplary of the invention and are intended to provide an overview or framework for understanding the nature of the invention as it is claimed. The accompanying drawings are included to provide further understanding of the invention and are incorporated in and constitute part of this specification. The drawings illustrate various embodiments of the invention and together with the description serve to explain the principles and operation of the invention.

BRIEF DESCRIPTION OF DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements and have been solely selected for ease of recognition in the drawing.

FIG. 7B is an exploded assembly view of the second device connector shown in FIG. 7A.

FIG. 7C is a rear side view of a connection board of the second device connector shown in FIGS. 7A and 7B.

DETAILED DESCRIPTION

Figure 1:
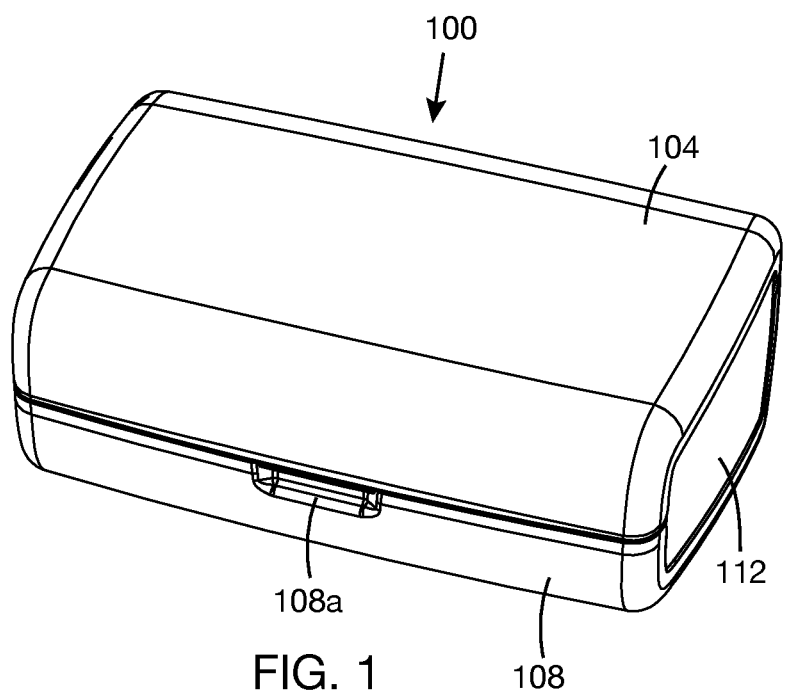
FIG. 1 is a frontal perspective view of a charger case according to one illustrative implementation.

In the following description, certain specific details are set forth in order to provide a thorough understanding of various disclosed implementations and embodiments. However, one skilled in the relevant art will recognize that implementations and embodiments may be practiced without one or more of these specific details, or with other methods, components, materials, etc. In other instances, well-known structures associated with portable electronic devices and head-worn devices have not been shown or described in detail to avoid unnecessarily obscuring descriptions of the implementations and embodiments. For the sake of continuity, and in the interest of conciseness, same or similar reference characters may be used for same or similar objects in multiple figures. For the sake of brevity, the term "corresponding to" may be used to describe correspondence between features of different figures. When a feature in a first figure is described as corresponding to a feature in a second figure, the feature in the first figure is deemed to have the characteristics of the feature in the second figure, and vice versa, unless stated otherwise.

In this disclosure, unless the context requires otherwise, throughout the specification and claims which follow, the word "comprise" and variations thereof, such as, "comprises" and "comprising" are to be construed in an open, inclusive sense, that is as "including, but not limited to."

In this disclosure, reference to "one implementation" or "an implementation" or to "one embodiment" or "an embodiment" means that a particular feature, structures, or characteristics may be combined in any suitable manner in one or more implementations or one or more embodiments.

In this disclosure, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the disclosure provided herein are for convenience only and do not interpret the scope or meaning of the embodiments.

Figure 2:
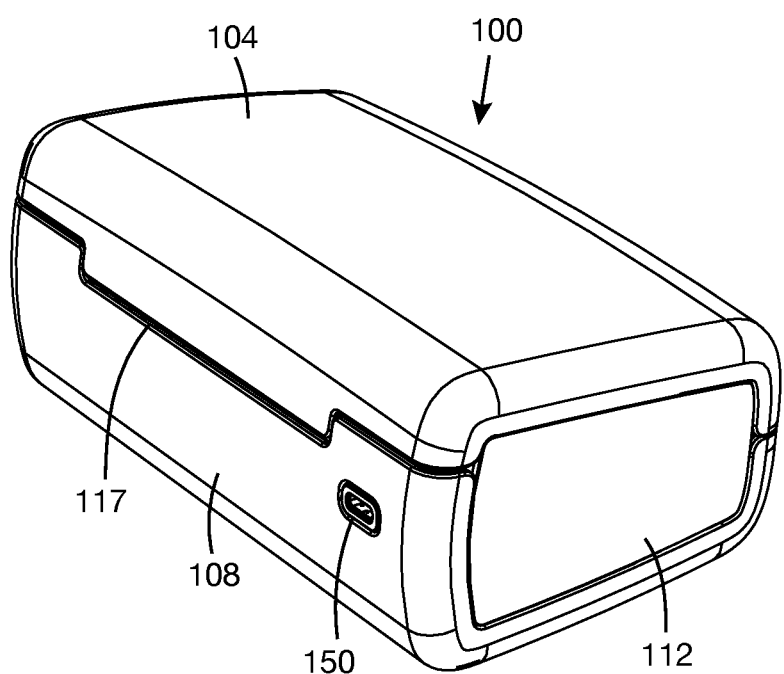
FIG. 2 is a rear perspective view of the charger case of FIG. 1.
Figure 3A:
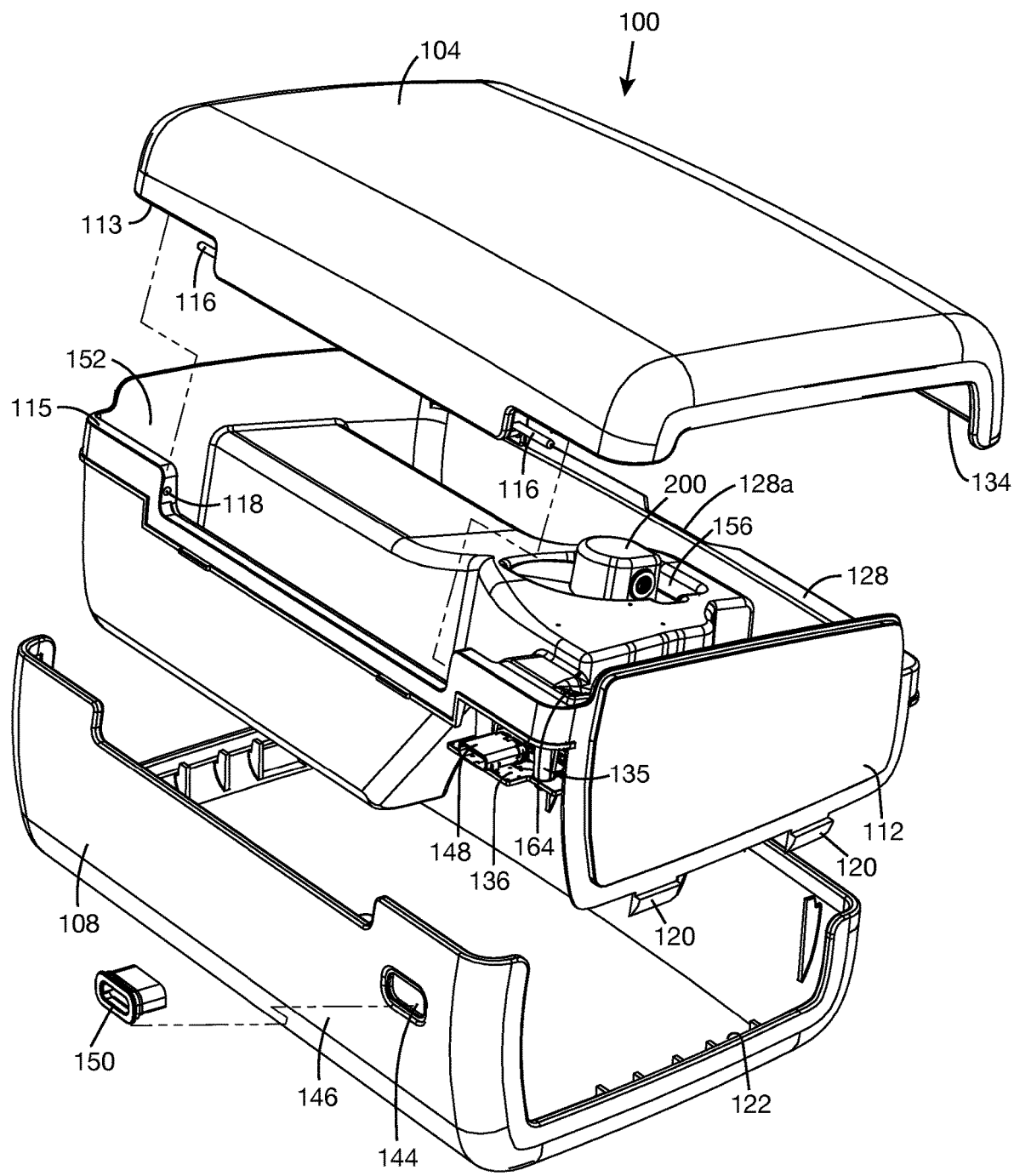
FIG. 3A is an exploded assembly view of the charger case of FIGS. 1 and 2.
Figure 3B:
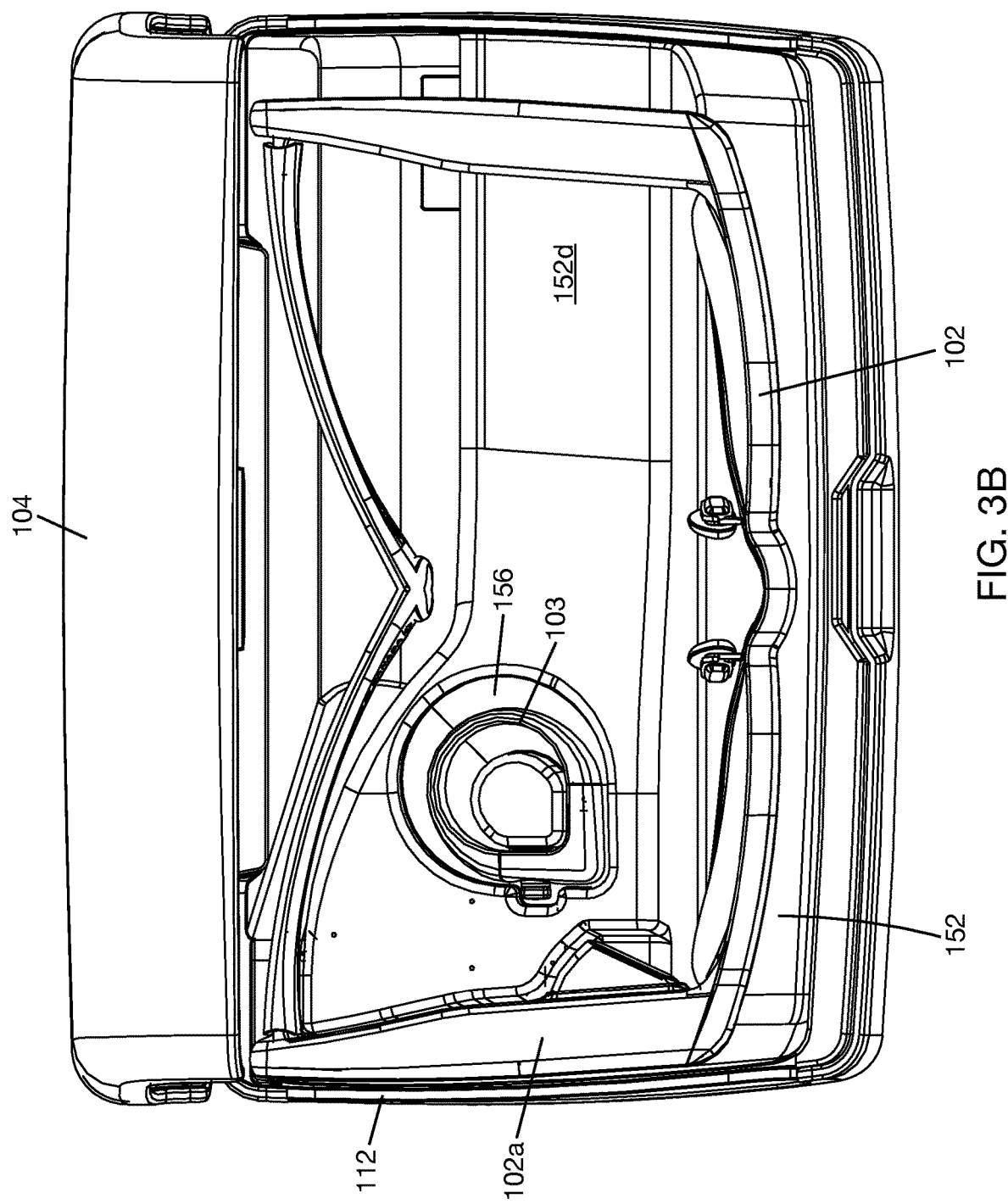
FIG. 3B shows two wearable devices inside storage compartments in the charger case of FIGS. 1-3A.

Referring to FIGS. 1, 2, 3A, and 3B, a charger case 100 includes a top cover 104, a bottom cover 108, and a docking tray 112. In the assembled charger case 100, docking tray 112 is nested in bottom cover 108. Docking tray 112 may include tabs 120 (in FIG. 3A) that snap into slots 122 (in FIG. 3A) in bottom cover 108 to secure docking tray 112 to bottom cover 108. A rear edge 113 (in FIG. 3A) of top cover 104 is pivotally coupled to a rear edge 115 (in FIG. 3A) of docking tray 112, as shown at 117 (in FIG. 2), which allows top cover 104 to be pivoted toward docking tray 112 to close charger case 100 (as shown in FIGS. 1 and 2) or pivoted away from docking tray 112 to open charger case 100 (as shown in FIG. 3B). When in the closed position or configuration, top cover 104 is positioned to limit or prevent physical access to an interior of the charger case from an exterior thereof. When in the open position or configuration, top cover 104 is positioned to provide physical access to the interior of the charger case from an exterior thereof. The pivotal joint between rear edges of top cover 104 and docking tray 112 may be formed by, for example, pivot pins 116 (in FIG. 3A) at rear edge 113 of top cover 104 that are received in holes 118 (in FIG. 3A) at rear edge 115 of docking tray 112. In an alternative implementation, top cover 104 may be pivotally coupled to bottom cover 108, and the docking tray 112 may be removably nested in bottom cover 108.

Figure 4A:
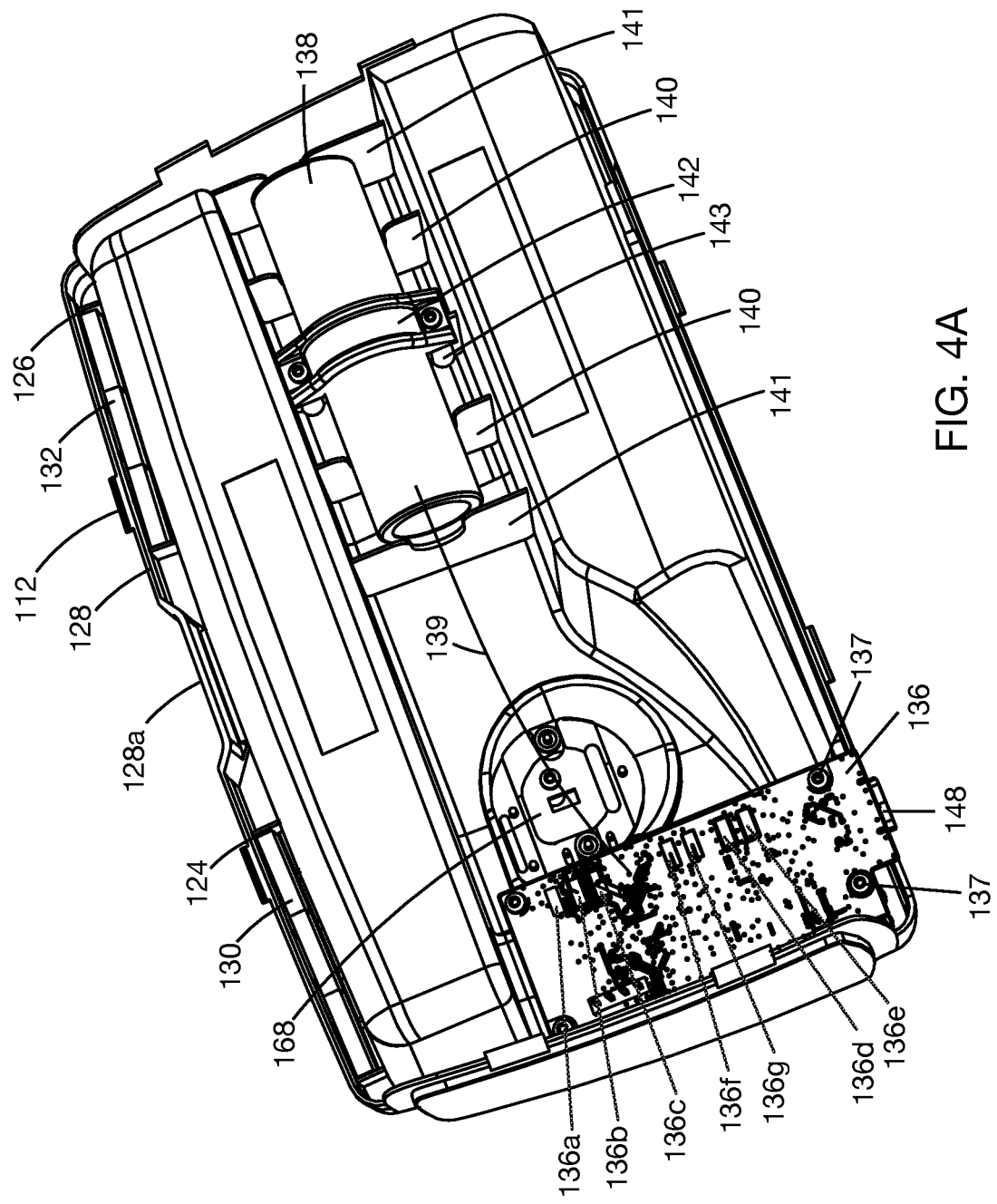
FIG. 4A is a bottom view of a docking tray of the charger case of FIGS. 1-3B.

FIG. 4A shows an underside of docking tray 112. In one example, as shown in FIG. 4A, pockets 124, 126 are formed underneath a front edge 128 of docking tray 112. Pockets 124, 126 hold magnets 130, 132, respectively. Magnets 130, 132 may be retained in their respective pockets 124, 126 by, for example, adhesive. Magnets 130, 132 assist in forming a magnetic closure between front edge 128 of docking tray 112 and a front edge 134 (in FIG. 3A) of top cover 104 (in FIG. 3A). Front edge 128 of docking tray 112 may include a recessed area 128a, which creates a space that a finger may be fitted in to facilitate separation of the magnetic closure when it is desired to pivot front edge 134 of top cover 104 away from front edge 128 of docking tray 112. A corresponding recessed area 108a (in FIG. 1) may be formed in the front edge of bottom cover (108 in FIG. 1). Top cover 104, bottom cover 108, and docking tray 112 may be formed, e.g., by molding, from plastic or other durable material. Front edge 134 (in FIG. 3A) of top cover 104 may include metal (or cooperating magnets) to form the magnetic closure with the magnets 130, 132 (in FIG. 4A).

Referring to FIG. 3A, the top side of docking tray 112 includes a first storage compartment 152 dimensioned to hold a first electronic device and a second storage compartment 156 dimensioned to hold a second electronic device. A first device connector 164 is exposed to first storage compartment 152 to make electrical contact with the first electronic device when the first electronic device is disposed in first storage compartment 152 for storage and charging. A second device connector 200 is exposed to second storage compartment 156 to make electrical contact with the second electronic device when the second electronic device is disposed in second storage compartment 156 for storage and charging. The shapes and dimensions of first storage compartment 152 and second storage compartment 156 are selected based on the shape and dimensions of electronic devices to be stored and charged. In one example, both first and second electronic devices are wearable electronic devices. As shown in FIG. 3B, in one example, first electronic device 102 may be a wearable heads-up display in the form of eyeglasses having a front frame and temples attached to opposite sides of the front frame. In one example, the temples have mid-hinges that enable the temples to be folded, thereby reducing the wearable heads-up display to a compact form. Also, in one example, second electronic device 103 may be a wearable UI device in the form of a ring or loop.

Referring to FIG. 4A, a portable charger 139 is coupled to the underside of docking tray 112. The portable charger 139 may be any suitable charger capable of charging the first and second electronic devices. In one example, the portable charger 139 includes a rechargeable battery 138. The portable charger 139 may further include a system on chip (SoC) 136, which is an integrated circuit with electronic circuits and parts for operation of the portable charger (only the backside of SoC 136 is visible in FIG. 4A). In one example, the portable charger 139 is capable of simultaneously charging two electronic devices with different charging characteristics, e.g., constant voltage charging and constant current charging. A suitable example of the portable charger 139 is disclosed in U.S. Provisional Application No. 62/733,243, the entire disclosure of which is incorporated herein by reference. (An alternative to a portable charger that is capable of simultaneously charging two electronic devices with different charging requirements may be two separate portable chargers, each configured to charge one of the two devices.)

In one implementation, SoC 136 and rechargeable battery 138 are coupled to the underside of docking tray 112. For example, SoC 136 may be mounted against posts (see 135 in FIG. 3A) formed on the underside of docking tray 112, and screws 137 may be inserted through mounting holes in SoC 136 into corresponding holes in the posts to secure SoC 136 to the posts. For example, fins 140 and end plates 141 formed at the underside of docking tray 112 define a slot in which rechargeable battery 138 is received. Fins 140 will also permit air flow around rechargeable battery 138. Rechargeable battery 138 may be secured in the slot formed by fins 140 and end plates 141 by a strap 142 that goes over battery 138 and is fastened to posts 143 on the underside of docking tray 112.

In the assembled charger case 100 (in FIGS. 1 and 2), the portable charger 139 is disposed between the underside of docking tray 112 and the inner surface of bottom cover (108 in FIGS. 1-3A). FIG. 3A shows an access opening 144 formed in a rear wall 146 of bottom cover 108. When docking tray 112 is nested in bottom cover 108, the access opening 144 aligns with a connector 148, e.g., a USB connector, on SoC 136. Thus, a cable may be connected to connector 148 from outside of charger case 100 through opening 144 to provide external power to a bus of SoC 136. A trim 150 (in FIGS. 2 and 3) may be inserted in opening 144 to protect opening 144 and for aesthetic purposes.

Figure 4B:
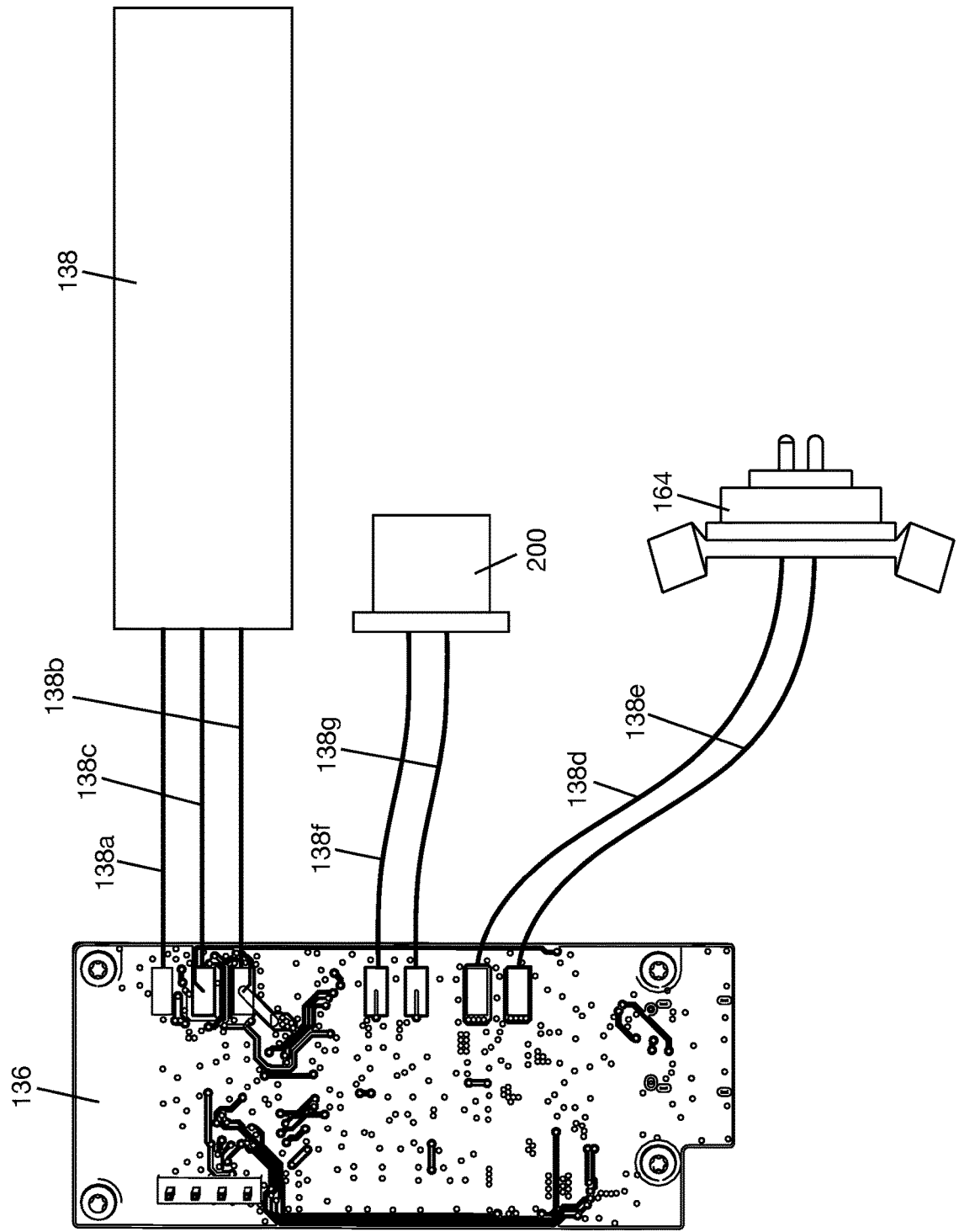
FIG. 4B shows wire connections between a portable charger and first and second device connectors.

Returning to FIG. 4A, terminals 136a, 136c on SoC 136 define a battery node to which the positive and negative terminals of rechargeable battery 138 can be connected. Terminal 136b on SoC 136 is for connection to a thermistor (not shown) that is in contact with battery 138. The thermistor will measure a temperature of battery 138, which can be used to determine an operating window of a battery charger circuit on SoC 136. Terminals 136d, 136e on SoC 136 define a first charging port for the first device connector 164 (in FIG. 3A). Terminals 136f, 136g on SoC 136 define a second charging port for the second device 200 (in FIG. 3A). Wire connections are omitted from FIG. 4A to avoid cluttering of the drawing. However, FIG. 4B shows wire connections 138a and 138b between SoC 136 and battery 138, wire connection 138c between SoC 136 and the thermistor in contact with battery 138, wire connections 138d, 138e between SoC 136 and first electrical connector 164, and wire connections 138f, 138g between SoC 136 and second electrical connector 200. By these connections, SoC 136 can supply power to first device connector 164 and second device connector 200 from an external power source or from battery 138. SoC 136 can also charge battery 138.

Figure 5A:
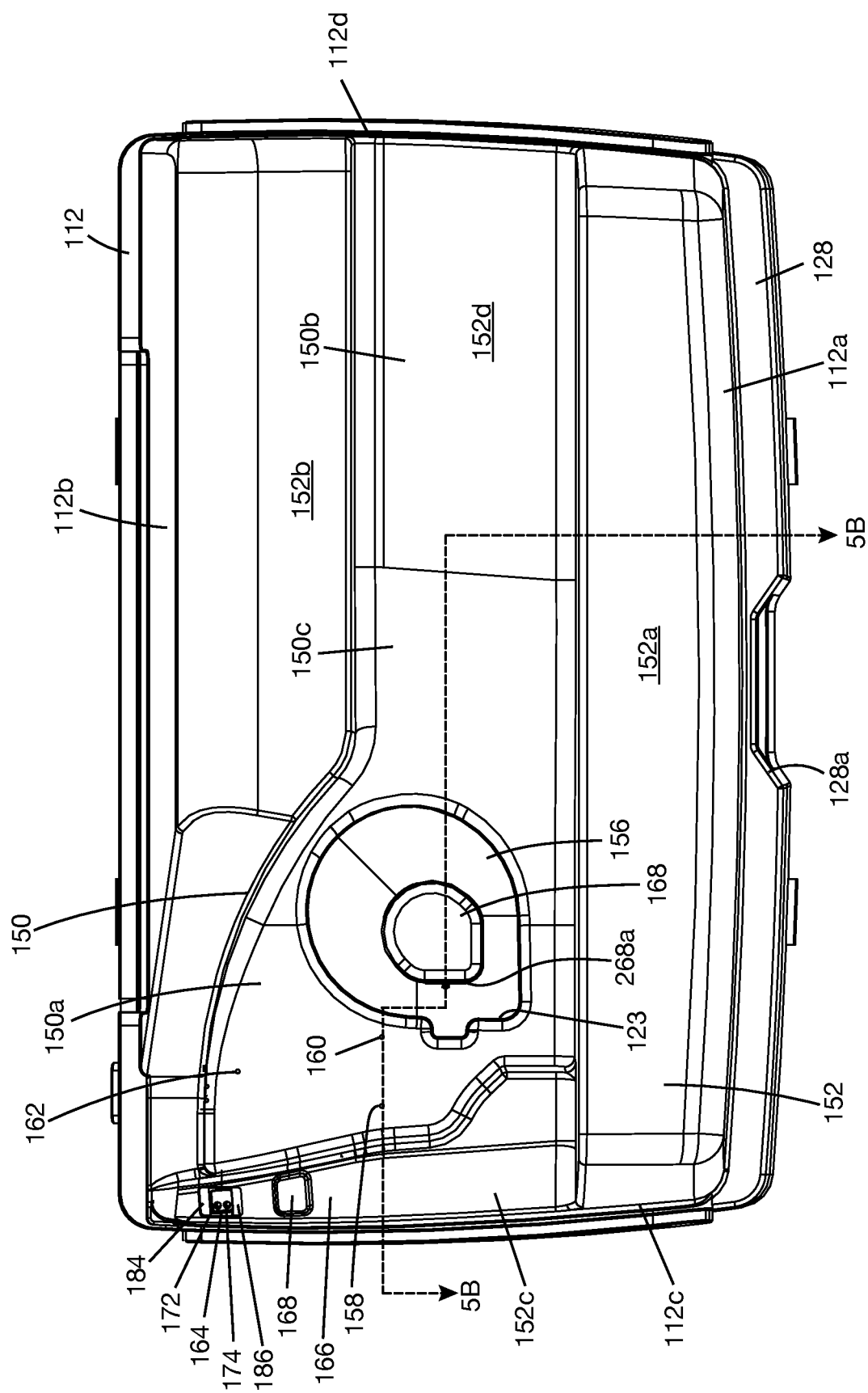
FIG. 5A is a top view of the docking tray of FIG. 3A.

In the top view of docking tray 112 shown in FIG. 5A, docking tray 112 has front wall 112*a*, rear wall 112*b*, and side walls 112*c*, 112*d* arranged to define an enclosure and a platform 150 formed within the enclosure. Platform 150 has a high platform area 150*a*, a low platform area 150*b*, and a connecting platform area 150*c* between high platform area 150*a* and low platform area 150*b*. First storage compartment 152 wraps around platform 150 and over low platform area 150*b*. For example, first storage compartment 152 includes a volume 152*a* defined between a side of platform 150 and front wall 112*a*, a volume 152*b* defined between a side of platform 150 and rear wall 112*b*, a volume 152*c* defined between a side of platform 150 and side wall 112*c*, and a volume 152*d* defined above low platform area 150*b* and adjacent to side wall 112*d*. First storage compartment 152 has a shape and dimensions to accommodate a wearable heads-up display in the form of eyeglasses having a front frame and temples attached to opposite sides of the front frame, where the temples have mid-hinges and are folded at the mid-hinges. For example, volume 152*a* can hold the front frame, volume 152*c* can hold a front part of a first temple of the wearable heads-up display, volume 152*d* can hold a front part of a second temple of the wearable heads-up display, and volume 152*b* can hold the folded back parts of the first and second temples (see FIG. 3B). The shape of first storage compartment 152 may be different than what is shown in FIG. 5A if the wearable heads-up display has front hinges that join the temple to the front frame (i.e., as opposed to mid-hinges on the temples)—with front hinges, the wearable heads-up display will fold in much the same manner as conventional eyeglasses. Second storage compartment 156 is formed on high platform area 150*a*. Second storage compartment 156 has the shape and dimensions of a ring or loop to accommodate a wearable UI device in the form of a ring or loop (see FIG. 3B).

Figure 5B:
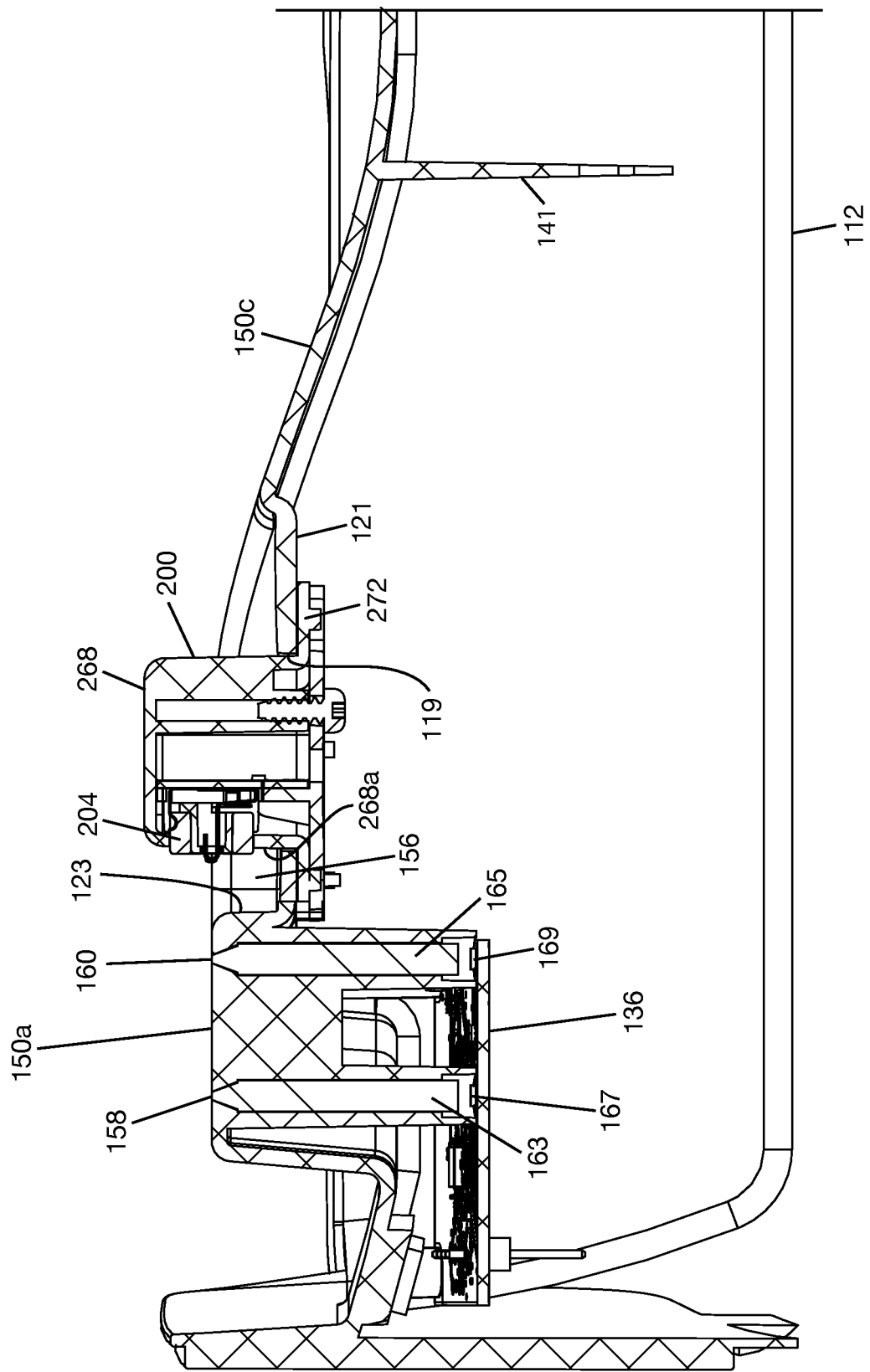
FIG. 5B is a cross-sectional view of the docking tray of FIG. 5A along line 5B-5B.

Openings 158, 160, 162 on docking tray 112 are open ends of light pipes embedded in docking tray 112. The light pipes are positioned to receive light from LEDs on SoC 136 (in FIGS. 3A, 4A, and 4B) of the portable charger. FIG. 5B shows a cross-section of docking tray 112 with light pipes 163, 165 corresponding to openings 158, 160, respectively. Light pipes 163, 165 are shown extending from the bottom side of docking tray 112 to the top side of docking tray 112 and positioned to receive light from LEDs 167, 169, respectively. A similar arrangement exists for the light pipe that has opening 162 (in FIG. 5A) on docking tray 112. Returning to FIG. 5A, light that is visible through opening 158 is used to indicate a charging state of the first electronic device, light that is visible through opening 160 is used to indicate a charging state of the second electronic device, and light that is visible through opening 162 is used to indicate a charging state of the rechargeable battery (138 in FIG. 4A) of the portable charger.

Figure 6A:
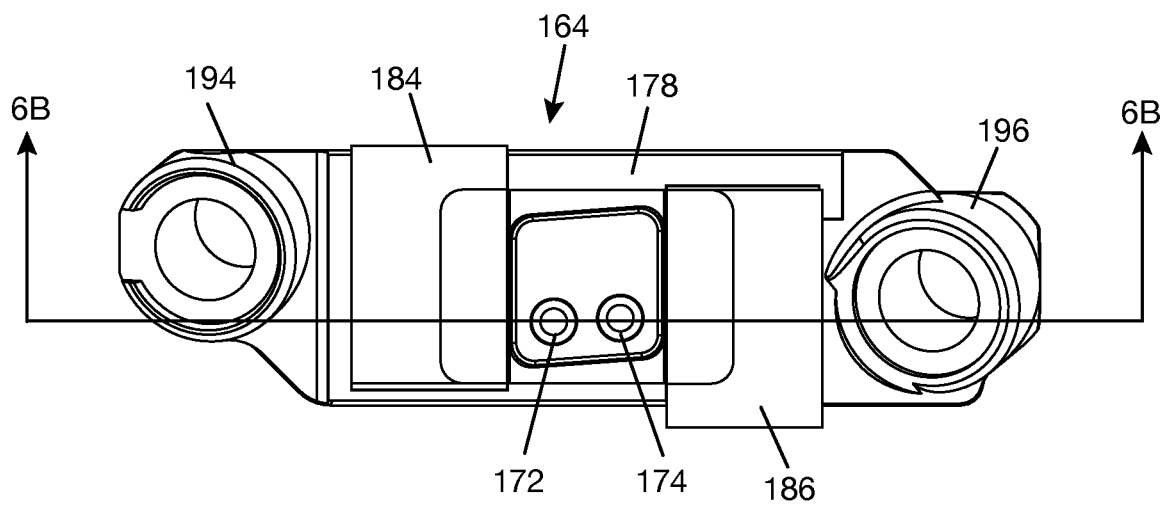
FIG. 6A is a top perspective view of a first device connector.
Figure 6B:
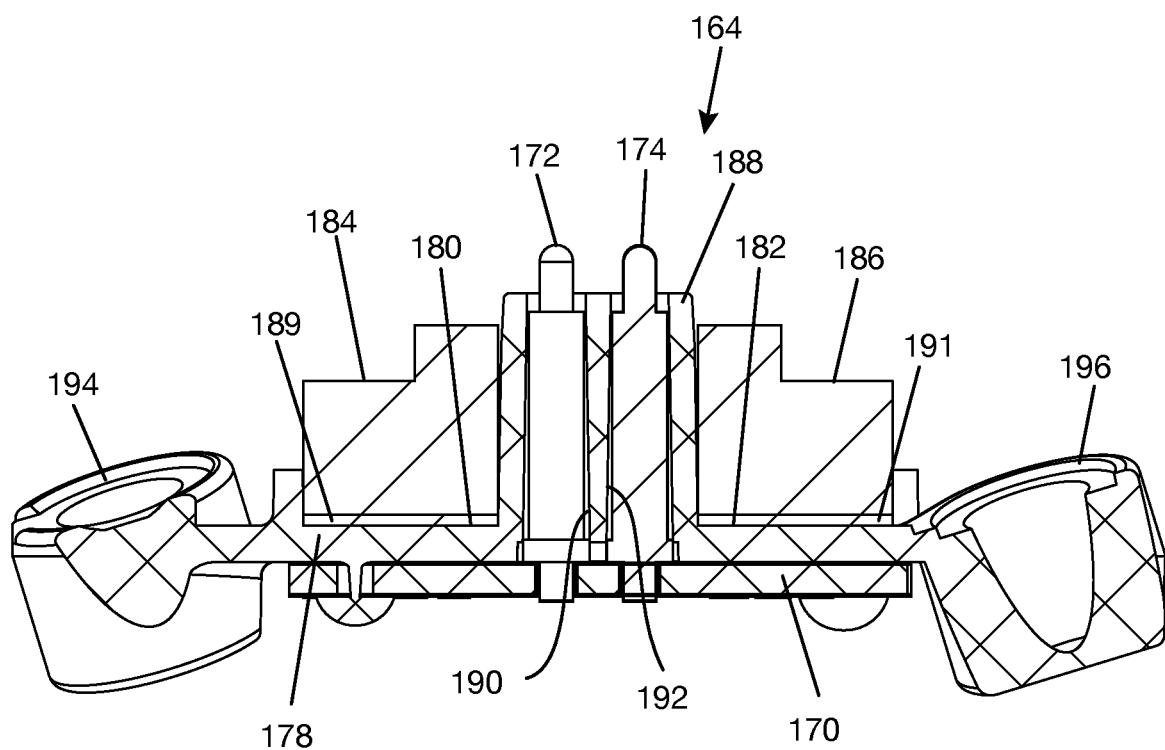
FIG. 6B is a cross-sectional view of the first device connector of FIG. 6A along line 6B-6B.
Figure 6C:
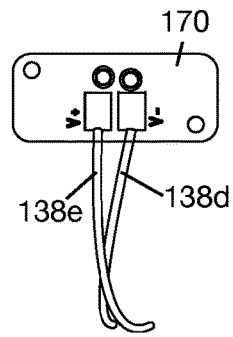
FIG. 6C is a rear side view of a connection board of the first device connector shown in FIGS. 6A and 6B.

Referring to FIGS. 6A and 6B, in one implementation, first device connector 164 includes a connection board 170 carrying contact pins 172, 174, which are made of an electrically conductive material, such as brass, a copper-nickel-silicon alloy, a silver alloy, or the like. FIG. 6C shows wires 138*e*, 138*d* soldered to a back side of connection board 170. Wire 138*e* is connected to contact pin 174 (in FIGS. 6A and 6B) through a conductive trace in connection board 170, and wire 138*d* is connected to a ground plane of connection board 170. Wires 138*e*, 138*d* are connected to the first charging port of SoC 136 (see FIG. 4B).

Returning to FIGS. 6A and 6B, first device connector 164 includes a magnet carrier 178 having magnet bearing surfaces 180, 182. Magnets 184, 186 are mounted on magnet bearing surfaces 180, 182, e.g., by adhesive pads 189, 191. Magnets 184, 186 will attract magnetic material, such as ferrous metal, on the first electronic device in order to establish firm contact between contact pins 172, 174 and corresponding contacts on the first electronic device during charging of the first electronic device. A central part 188 of the magnet carrier 178 in between the magnet bearing surfaces 180, 182 includes through-holes 190, 192 that receive contact pins 172, 174. When connection board 170 is mounted at the back of magnet carrier 178 as shown in FIG. 6B, contact pins 172, 174 extend through and out of the central part 188 and are thereby exposed for making electrical contact with the first electronic device. Magnet carrier 178 includes mounting arms 194, 196 with through-holes. Fasteners can be inserted through the holes in arms 194, 196 and into corresponding holes in docking tray 112 (in FIGS. 1-5B) to secure magnet carrier 178 to the docking tray.

Returning to FIG. 5A, first device connector 164 is mounted to docking tray 112 such that contact pins 172, 174 are exposed at a surface 166 of docking tray 112 forming part of first storage compartment volume 152*c*. Magnets 184, 186 are also exposed at surface 166. In one example, surface 166 includes a magnet 168 that can be used to detect when the first electronic device is in the charger case and in a position to be charged. For example, the first electronic device may include a magnet detector or sensor on a part of the first electronic device that will be supported on surface 166, e.g., a temple (see 102*a* in FIG. 3B) in the case of a wearable heads-up display having the form of eyeglasses. The magnet detector or sensor will detect or sense magnet 168 when the first electronic device is positioned in the first storage compartment 152. The first electronic device may then allow itself to be charged once magnet 168 is detected. It is also possible to reverse this arrangement, where the magnet detector or sensor is at or proximate surface 166 and the magnet to be detected is carried by the first electronic device.

Figure 7A:
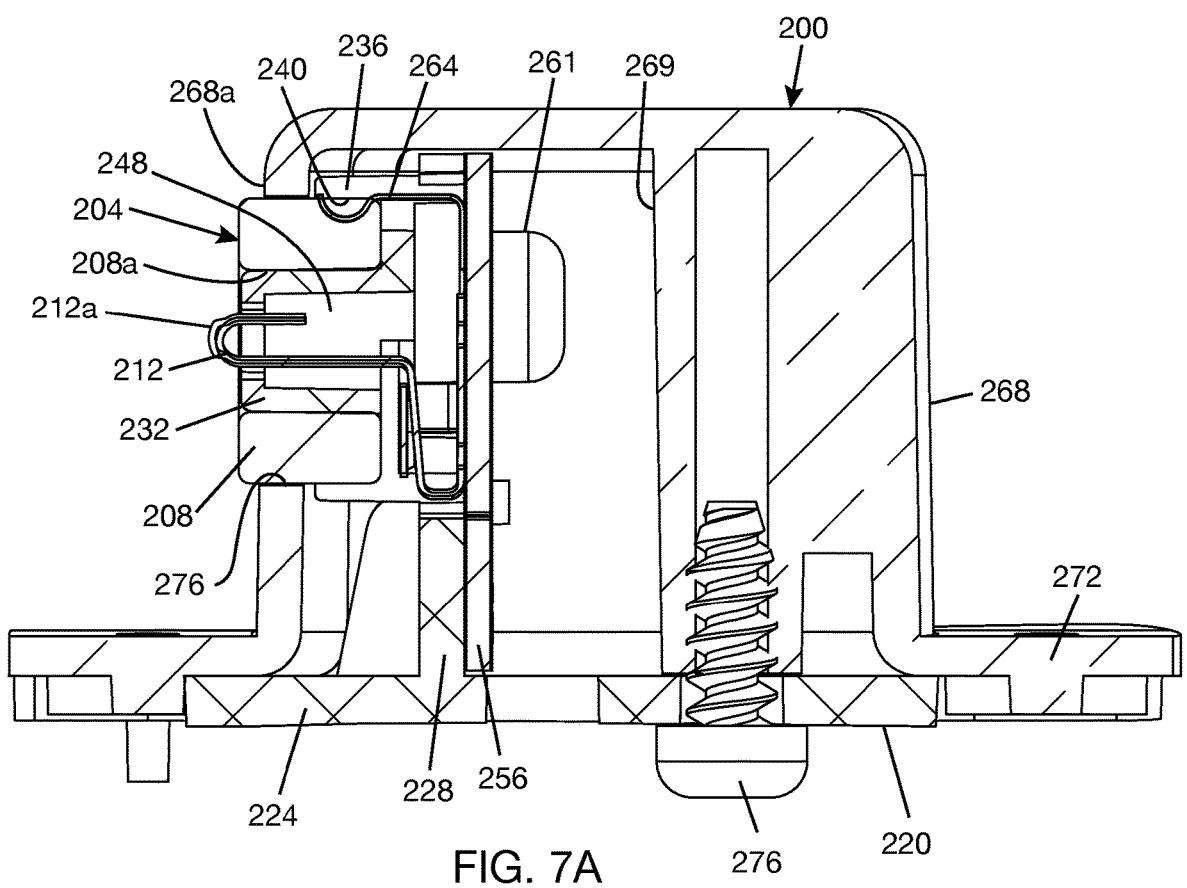
FIG. 7A is a cross-sectional view of a second device connector.

Referring to FIGS. 7A and 7B, in one implementation, second device connector 200 includes a connection board 256 carrying a contact pin 212 made of an electrically conductive material. In one example, contact pin 212 is a flat spring, e.g., made of a flat strip of electrically conductive material. One end of the flat spring is curved or bent to form the contact end of the contact pin 212. Connection board 256 carries a circular bracket 260 (in FIG. 7B) with circumferentially arranged spring tabs 264. FIG. 7C shows wires 138*f*, 138*g* soldered to a backside of connection board 256. Wire 138*g* is connected to contact pin 212 (in FIGS. 7A and 7B) through a conductive trace in connection board 256, and wire 138*f* is connected to a ground plane of connection board 256. Bracket 260 (in FIG. 7B) is also connected to a ground plane of connection board 256. Wires 138*f*, 138*g* are connected to the second charging port of SoC 136 (see FIG. 4B).

Returning to FIGS. 7A and 7B, second device connector 200 includes a chassis 220 having a base plate 224 and a vertical support 228 mounted on base plate 224. Connection board 256 is mounted to a rear side of vertical support 228. A slot 257 (in FIG. 7B) at a side of printed board 256 is aligned with a hole 259 (in FIG. 7B) on vertical support 228. A screw 261 having a head larger than slot 257 is inserted through slot 257 and threaded into hole 259 to establish firm contact between connection board 256 and the backside of vertical support 228. A support rod 232 is formed at a front side of vertical support 228. A sleeve 236 is also formed at the front side of vertical support 228. Sleeve 236 circumscribes support rod 232 and is coaxial with support rod 232. Magnet 208 having a bore 208a is mounted on support rod 232 and arranged in an annular space 240 between sleeve 236 and support rod 232. Magnet 208 may be made of an electrically conductive material. Sleeve 236 includes longitudinal slits 244 (in FIG. 7B) that receive spring tabs 264 on connection board 256. Spring tabs 264 move out of the way to accommodate magnet 208 and apply a spring force to clamp magnet 208 to support rod 232. This effectively couples magnet 208 to the ground plane of connection board 256, allowing magnet 208 to serve as ground contact.

Support rod 232 has a central opening 248 that receives contact pin 212 on connection board 256. Vertical support 228 includes an opening that is aligned with central opening 248, allowing contact pin 212 to be inserted into central opening 248 from the backside of vertical support 248. Contact pin 212 effectively extends through bore 208a of magnet 208, with support rod 232 in between magnet 208 and contact pin 212. In one example, support rod 232 is made of an electrically non-conductive material, such as plastic or the like, and functions as an insulator to isolate contact pin 212 from magnet 208. Magnet 208, contact pin 212, and support rod/insulator 232 form a magnetic connector 204, which is electrically coupled to SoC 136 (see FIGS. 3A, 4A, and 4B) when the charger case is assembled. In one example, contact pin 212 extends out of central opening 248 (see FIG. 7A), protruding relative to a front surface of magnet 208, as shown at 212a, for contact with the second electronic device.

Second device connector 200 further includes a cap 268. Base plate 224 is shown abutting a bottom end of cap 268. Base plate 268 may be attached to cap 268 by, for example, a screw 276 that is inserted into aligned holes in base plate 224 and cap 256. Cap 268 is generally in the form of a cylindrical body having a cavity 269 to receive vertical support 228 and the components coupled to vertical support 228. A side wall of cap 268 includes an opening 276. When vertical support 228 is received inside cap 268, magnetic connector 204 on vertical support 228 is aligned with opening 276. In one example, magnetic connector 204 protrudes from a side surface 268a of cap 268, through opening 276, to facilitate electrical contact with the second electronic device. A second electronic device in the form of a loop can be mounted over cap 268, with the connector port of the second electronic device in opposing relation to and mating with the magnetic connector 204. An example of a wearable UI device having a connector port that can mate with the magnetic connector 204 is disclosed in U.S. Provisional Application No. 62/608,385 ("Magnetic Connector for a Wearable Ring").

The bottom end of cap 268 includes a flange 272. Referring to FIG. 5B, flange 272 can be used to mount the assembled device connector 200 to docking tray 112. In one example, docking tray 112 includes an opening 119, and cap 268 is inserted through opening 119, with flange 272 abutting a bottom surface 121 of docking tray 112 and secured to the bottom surface 121. In one example, as shown in FIG. 5A, the second storage compartment 156 having a loop shape is formed between a surface 123 of the docking tray 112 and side surface 268a of cap 268.

Instead of charging the electronic devices by electrical pin contact, charging by induction may be used. For example, the first device connector 164 may alternatively include an inductor that can be inductively coupled to a complementary inductor on the first electronic device. Similarly, the second device connector 200 may alternatively include an inductor that can be inductively coupled to a complementary inductor on the second electronic device.

The above description of illustrated implementations and embodiments, including what is described in the Abstract of the disclosure, is not intended to be exhaustive or to limit the implementations or embodiments to the precise forms disclosed. Although specific implementations and embodiments and examples are described herein for illustrative purposes, various equivalent modifications can be made without departing from the spirit and scope of the disclosure, as will be recognized by those skilled in the relevant art. The teachings provided herein of the various implementations and embodiments can be applied to other portable and/or wearable electronic devices, not necessarily the exemplary wearable electronic devices generally described above.

The invention claimed is:

1. A charger case for storing and charging a first electronic device and a second electronic device, the charger case comprising:
   a top cover;
   a bottom cover;
   a docking tray mounted between the top cover and the bottom cover, the docking tray having a top side including a first storage compartment to hold the first electronic device and a second storage compartment to hold the second electronic device;
   a first device connector exposed to the first storage compartment, the first device connector to establish electrical communication with the first electronic device;
   a second device connector exposed to the second storage compartment, the second device connector to establish electrical communication with the second electronic device; and
   a portable charger comprising a rechargeable battery, the portable charger disposed in a space between the docking tray and the bottom cover, the portable charger having a first charging port electrically coupled to the first device connector and a second charging port electrically coupled to the second device connector.

2. The charger case of claim 1, wherein a rear edge of the top cover is pivotally coupled to a rear edge of the docking tray.

3. The charger case of claim 1, wherein the first device connector and the second device connector are fastened to the docking tray.

4. The charger case of claim 1, wherein the first device connector comprises a pair of contact pins exposed at a surface of the docking tray forming part of the first storage compartment.

5. The charger case of claim 4, wherein the surface of the docking tray forming part of the first storage compartment carries a magnet to be detected by the first electronic device when the first electronic device is held in the first storage compartment.

6. The charger case of claim 4, wherein the first device connector comprises a magnet carrier plate and a pair of magnets in spaced apart relation on the magnet carrier plate, wherein the pair of magnets are exposed at the surface of the docking tray forming part of the first storage compartment.

7. The charger case of claim 6, wherein the pair of contact pins are received in a central part of the magnet carrier plate between the pair of magnets.

8. The charger case of claim 7, wherein the first charging port of the portable charger is electrically coupled to the pair of contact pins.

9. The charger case of claim 1, further comprising a plurality of light pipes embedded in the docking tray and having openings on the top side of the docking tray, wherein each of the light pipes is positioned to receive light from at least one light emitting diode in the portable charger.

10. The charger case of claim 1, wherein a bottom side of the docking tray includes a plurality of fins defining a slot in which the rechargeable battery is received.

11. The charger case of claim 1, wherein the portable charger comprises a Universal Serial Bus (USB) connector, and wherein the bottom cover includes an access opening aligned with the USB connector.

12. The charger case of claim 1, wherein the portable charger further comprises a system on chip providing the first charging port and the second charging port, wherein the system on chip is retained on the bottom side of the docking tray, and wherein the second device connector comprises a magnetic connector electrically connected to the system on chip.

13. The charger case of claim 12, wherein the magnetic connector comprises a magnet having a bore, a contact pin received in the bore, and an insulator arranged in the bore to separate the magnet from the contact pin.

14. The charger case of claim 13, wherein the second device connector further comprises a chassis carrying the magnetic connector and a cap having a cavity within which the magnetic connector carried by the chassis is received, the cap having a side opening, wherein the magnetic connector is exposed at the side opening.

15. The charger case of claim 14, wherein the magnetic connector protrudes from a side surface of the cap through the side opening.

16. The charger case of claim 15, wherein the cap includes a flange, and wherein the flange is fastened to the docking tray.

17. The charger case of claim 16, wherein the second storage compartment is defined between a surface of the docking tray and a surface of the cap.

18. The charger case of claim 1, wherein the docking tray includes a pocket at a front edge thereof, and further comprising at least one magnet disposed in the pocket to form a magnetic closure between a front edge of the top cover and the front edge of the docking tray.

19. The charger case of claim 1, wherein the first storage compartment has a volume to contain a wearable heads-up display in folded form, and wherein the second compartment has a loop shape.

20. A charger case to store and charge a first electronic device and a second electronic device, the charger case comprising:
a housing having an interior;
a cover movably coupled to the housing, the cover selectively movable between a closed configuration in which the cover prevents access to the interior of the housing from an exterior thereof and an open configuration in which the cover provides access to the interior of the housing from the exterior thereof;
a docking tray in the interior of the housing, the docking tray having a top side including a first storage compartment to hold the first electronic device and a second storage compartment to hold the second electronic device, the top side of the docking tray accessible from the exterior of the housing when the cover is in the open configuration;
a first charging interface chargingly coupleable to charge the first electronic device when the first electronic device is in the first storage compartment of the docking tray;
a second charging interface chargingly coupleable to charge the second electronic device when the second electronic device is in the second storage compartment of the docking tray; and
a first rechargeable power source electrically coupled to at least one of the first charging interface and the second charging interface to provide electrical power thereto.

21. The charger case of claim 20, wherein the first charging interface includes a first device connector having a first set of electrical contacts directly electrically accessible by the first electronic device when the first electronic device is in the first storage compartment of the docking tray, and wherein the second charging interface includes a second device connector having a second set of electrical contacts directly electrically accessible by the second electronic device when the second electronic device is in the second storage compartment of the docking tray.

22. The charger case of claim 20, wherein the first charging interface includes a first inductor inductively coupleable to a complementary inductor of the first electronic device when the first electronic device is in the first storage compartment of the docking tray, and wherein the second charging interface includes a second inductor inductively coupleable to a complementary inductor of the second electronic device when the second electronic device is in the second storage compartment of the docking tray.

23. The charger case of claim 20, wherein the first storage compartment is shaped to hold a wearable heads-up display and the second storage compartment is shaped to hold a ring user input device.

* * * * *